US008873668B2

(12) United States Patent
Ferris et al.

(10) Patent No.: US 8,873,668 B2
(45) Date of Patent: Oct. 28, 2014

(54) COMMUNICATIONS ARRANGEMENT FOR A SYSTEM IN PACKAGE

(71) Applicants: STMicroelectronics SA, Montrouge (FR); STMicroelectronics (R&D) Ltd, Marlow (GB); STMicroelectronics (Grenoble 2) SAS, Grenoble (FR)

(72) Inventors: Andrew Ferris, Bristol (GB); Ignazio Antonino Urzi, Voreppe (FR); Pascal Teissier, Sechilienne (FR)

(73) Assignees: STMicroelectronics SA, Montrouge (FR); STMicroelectronics (Research & Development) Limited, Marlow (GB); STMicroelectronics (Grenoble 2) SAS, Grenoble (FR)

( * ) Notice: Subject to any disclaimer, the term of this patent is extended or adjusted under 35 U.S.C. 154(b) by 59 days.

(21) Appl. No.: 13/651,883

(22) Filed: Oct. 15, 2012

(65) Prior Publication Data

US 2013/0142227 A1    Jun. 6, 2013

(30) Foreign Application Priority Data

Dec. 6, 2011    (GB) ................................. 1120959.0

(51) Int. Cl.
  *H04L 25/34*    (2006.01)
(52) U.S. Cl.
  USPC ....................................................... 375/290
(58) Field of Classification Search
  CPC .................................. H04B 1/38; H04B 1/40
  USPC ........................................................ 375/219
  See application file for complete search history.

(56) References Cited

U.S. PATENT DOCUMENTS

| | | |
|---|---|---|
| 5,828,865 A | 10/1998 | Bell |
| 2005/0123085 A1* | 6/2005 | Skog et al. ..................... 375/354 |
| 2007/0067541 A1* | 3/2007 | Chang ........................... 710/307 |
| 2009/0199023 A1* | 8/2009 | Lee et al. ...................... 713/300 |
| 2009/0238249 A1* | 9/2009 | van Waasen et al. ......... 375/219 |
| 2010/0020601 A1* | 1/2010 | Lee et al. .................. 365/185.03 |
| 2010/0260147 A1* | 10/2010 | Xing et al. .................... 370/332 |
| 2011/0113210 A1* | 5/2011 | Klapman et al. .............. 711/163 |
| 2011/0197008 A1 | 8/2011 | Itou et al. |
| 2011/0294418 A1* | 12/2011 | Chen .......................... 455/41.1 |
| 2012/0051141 A1* | 3/2012 | Lee et al. ................. 365/185.18 |
| 2012/0110351 A1* | 5/2012 | Raju et al. .................... 713/300 |
| 2012/0275498 A1* | 11/2012 | van Waasen et al. ......... 375/219 |
| 2013/0170525 A1* | 7/2013 | Asaad et al. .................. 375/219 |

OTHER PUBLICATIONS

UK Search Report for GB1120959.0 mailed Mar. 21, 2012 (5 pages).

* cited by examiner

*Primary Examiner* — Santiago Garcia
(74) *Attorney, Agent, or Firm* — Gardere Wynne Sewell LLP

(57) ABSTRACT

A circuit includes a first n-bit communications block and a second m-bit communications block. A controller is configured to control mode of operation for the first and second communications blocks. In a first mode, the first and second communications blocks function as a single communications block for n+m bit communications. In a second mode, the first and second communications blocks operate as substantially independent communications block for n bit communications and m bit communications.

25 Claims, 4 Drawing Sheets

COMMUNICATIONS ARRANGEMENT FOR A SYSTEM IN PACKAGE

PRIORITY CLAIM

This application claims priority from Great Britain Application for Patent No. 1120959.0 filed Dec. 6, 2011, the disclosure of which is incorporated by reference.

TECHNICAL FIELD

The present invention relates to an arrangement and in particular but not exclusively to an arrangement which may be used in a die in a system-in-package.

BACKGROUND

It has been proposed to provide a System-in-Package SiP having two or more dies. Communication needs to take place between the two dies. In particular, each die will transmit data to the other die.

SUMMARY

According to an aspect, there is provided an arrangement comprising: a first n-bit block; a second m-bit block; and a controller configured to control said arrangement, said arrangement having a first mode in which said blocks as a single block and a second dual bit mode in which the blocks operate substantially independently.

In an embodiment, a circuit comprises: a first transceiver having an n-bit communications port configured to communicate n-bit communications data and a first clock port configured to communicate a first clock signal; a second transceiver having an m-bit communications port configured to communicate m-bit communications data and a second clock port configured to communicate a second clock signal; and a controller configured to control said first and second transceivers in a first mode wherein said n-bit communications data and said m-bit communications data are clocked by the first clock signal at said first clock port and in a second mode wherein said n-bit communications data is clocked by the first clock signal at said first clock port and said m-bit communications data is clocked by the second clock signal at said second clock port.

In an embodiment, a circuit comprises: a first n-bit transceiver; a second m-bit transceiver; and a controller configured to control operation of said first and second transceivers in an operating mode selected from a plurality of supported operating modes including: a first mode wherein said first and second transceivers are configured to support n+m bit communications in response to a single clock signal; and a second mode wherein said first and second transceivers are configured to support separate n-bit and m-bit communications in response separate clock signals.

BRIEF DESCRIPTION OF THE DRAWINGS

For an understanding of some embodiments, reference will be made by way of example only to the accompanying figures in which.

DETAILED DESCRIPTION OF THE DRAWINGS

Figure 1:
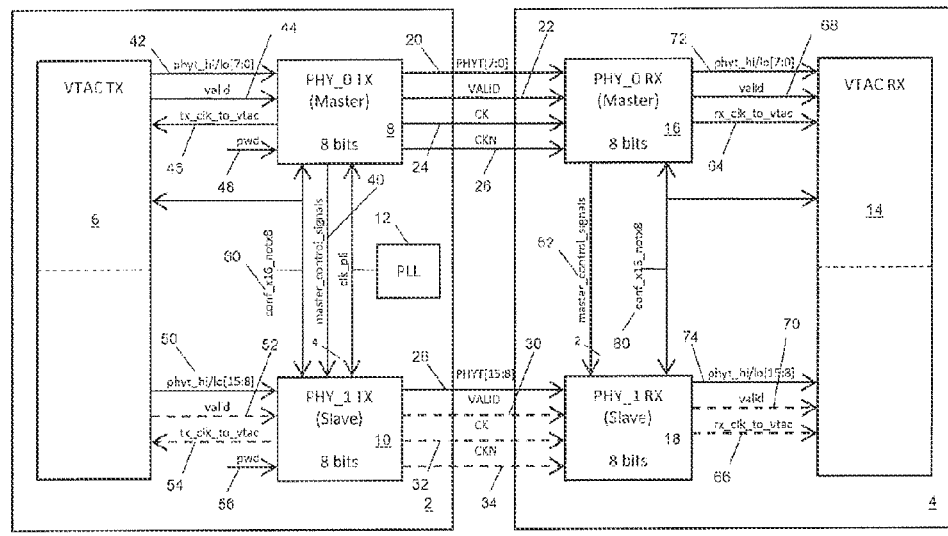
FIG. 1 schematically shows a System-in-Package comprising a first die and a second die, operating in a first mode.

Some embodiments may be used where there are more than one die within a single package. In particular, a plurality of integrated circuit dies may be incorporated within a single package. In the following examples, FIG. 1 shows a single System-in-Package having two dies which is provided to explain in detail the interaction between two dies. However it is appreciated that three or more dies may be provided in some embodiments in the same single package.

The decreasing feature size in CMOS silicon processes allows digital logic to shrink significantly in successive fabrication technology. For example, an area shrink of approximately 50% may be obtained when comparing a digital logic cell implemented in 90 nanometer technology with a digital logic cell implemented in 65 nanometer technology. However, analog and input/output cells tend to shrink much less if at all in these implementations. This may lead to increasingly pad limited designs in many complex system-on-chips (SoC). A pad limited design can be considered wasteful if the digital logic is not implemented as densely as it might be if it were the determining factor in the device area.

Another factor in some embodiments is that the transition, for example, to a sub 32 nanometer design may introduce a dichotomy between supporting low voltage, high speed input/output logic such as DDR3 (Double Data Rate) RAM (Random Access Memory) 1.5 V @ 800 MHz or higher on the one hand and higher voltage interconnect technologies, for example HDMI (High Definition Multimedia Interface), SATA (Serial Advanced Technology Attachment), USB3 (Universal Serial Bus), etc. The lower voltage DDR3 interface may require a lower transistor gate oxide thickness as compared to the HDMI technology. This may be incompatible within a standard process.

Porting of high speed analog interfaces to a new process consumes a lot of resource in terms of time and expert attention. By decoupling the implementation of analog blocks from that of digital blocks of the system may allow a reduction in time to working silicon.

By splitting a traditional monolithic system-on-chip into a plurality of dies in order to form a System-in-Package comprising two or more dies, advantages can be achieved. For example, each die may be designed to provide a particular function which may require various different mixes of analog and digital circuitry in the implementation of the particular function. This means that in some embodiments, it may be possible to use the same die or same design for a die in different System-in-Package. This modularity may reduce design time.

Embodiments may be used where there are two or more dies in the package. Embodiments may be used where the dies are manufactured in different technologies. Embodiments may be used alternatively or additionally where it is advantageous for at least one of the dies to be certified, validated or tested independently for conformance to, for example, a standard. Embodiments may alternatively or additionally be used where one of the dies contains special purpose logic to drives specific wireless, optical or electrical interfaces so that the other die or dies can be manufactured independently and not incur any costs associated with the special purpose logic. Embodiments may alternatively or additionally be used where one of the dies contains information, for example encryption information, which is to be withheld from the designers/manufacturers of the other die or dies. Embodiments may alternatively or additionally be used where one of the dies contains high density RAM (Random Access Memory) or ROM (Read Only Memory) and it is preferable to separate this from standard high speed logic for reasons of fabrication yield and/or product flexibility.

It should be appreciated that some embodiments may have additional or alternative advantages other than those discussed previously.

Figure 2:
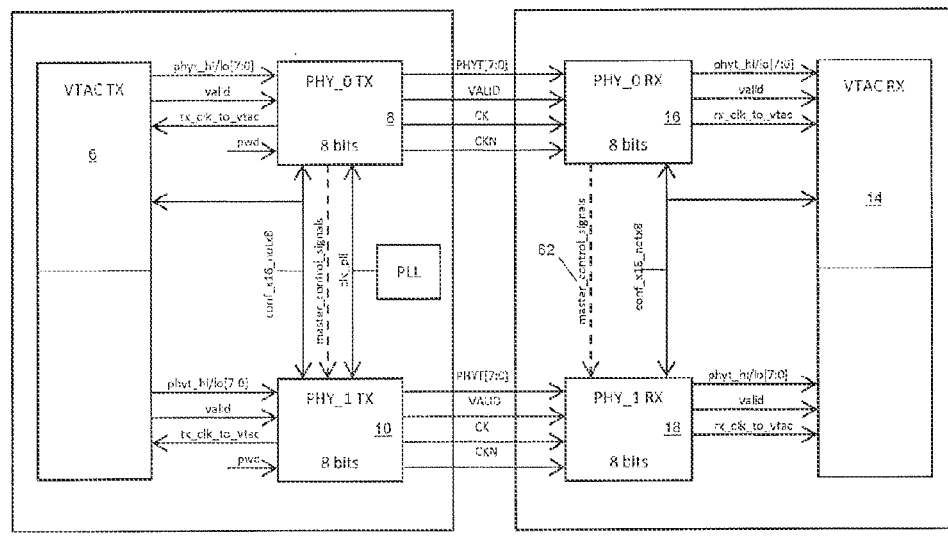
FIG. 2 schematically shows the System-in-Package of FIG. 1 operating in a second mode.

In embodiments of the invention, the two dies are arranged to have a first mode, illustrated in FIG. 1 and a second mode illustrated in FIG. 2. These modes will be described in more detail.

As shown in FIGS. 1 and 2, a first die 2 and a second die 4 are provided. For simplicity, the first die 2 is shown as a transmitting die and the second die is shown as a receiving die. In practice, each die may be a transmitter and receiver and accordingly will incorporate both the transmission and the receiving circuitry illustrated in FIGS. 1 and 2.

The first die comprises a controller 6. The controller 6 is coupled to a first physical transmitter block 8 and to a second physical transmitter block 10. The first die 2 comprises a phase lock loop PLL 12 which is arranged to provide a clock output to both the first and the second physical transmitter blocks 8 and 10.

The second die 4 comprises a controller 14 which is coupled to first and second physical receiver blocks 16 and 18.

In the example shown, the respective transmitter blocks and receiver blocks are each 8 bit physical blocks. Thus, the first physical transmitter block 8 has an 8 bit data interface with the first physical receiver block 16. Likewise, the second physical transmitter block 10 has an 8 bit data interface with the second physical receiver block 18. In some embodiments, each of the transmitter and receiver blocks has an 8 bit data interface. However, this is by way of example and any other suitable number of bits can be used.

In some embodiments, the two transmitter blocks and the two receiver blocks have the same size data interface N, where N equals 8 or any other suitable number. In alternative embodiments, the first and second transmitter blocks may have different sized interfaces where one interface has more bits than the other. By way of example only, one interface may have a first multiple of eight bits and the second interface may have a second different multiple of eight bits. For example the first and second interfaces may be 16 and 8 bits respectively or 32 and 16 bits respectively. In alternative embodiments where the interfaces are differently sized, the number of bits of at least one interface may not be a multiple of eight but may have a different number of bits, N and M, where N and M are different.

In the arrangement shown in FIG. 1, the transmitter controller 6 is arranged to configure the first transmitter block 8 to be a master and the second physical transmitter block 10 to be a slave. The first mode is a 2N bit mode and in the example where N is 8, the two dies will have a 16 bit data mode interface. Alternatively the first mode may N+M mode.

In the arrangement shown in FIG. 2, the two dies have a dual N bit mode as a second mode. The two N bit interfaces may be independent. Alternatively the second mode may be a N bit mode and a M bit mode.

In one embodiment, the two dies can be controlled to switch between the first mode and the second mode.

In one application, the 16 bit mode can be used, for example for a 1080p120 video stream. This may be used for a 1080p60L60R 3D television picture.

The 8 bit mode may be used for two independent 1080pP60 2D video flows, for example the main video and PIP.

As will be described, in some embodiments, each of the physical transmitters have the same structure and as will be explained are placed in a mirrored fashion. In preferred embodiments the two transmitters have the same physical entity or layout and are placed in a mirrored fashion. Similarly, the receiver blocks again have the same structure and layout, again being provided in a mirrored fashion. This may mean that characteristics such as delay, timing, etc., are the same in each of the mirrored structures. It should be appreciated that in some implementations, the transmitter blocks are also provided on the second die. In those embodiments, the transmitter blocks on the first die may have the same structure as those on the second die. Similarly, where receiver blocks are provided on the first die, those receiver blocks may have the same structure as those provided on the second die. Any two transmitter or receiver blocks, on each die, may be placed in mirrored fashion. The same structures on the two dies may share the same rtl (register transfer level) source.

The signals between the various blocks will now be described. Between the first physical transmitter block 8 and the first physical receiver block 16 are the following signals: the 8 bit data signal (bits 0 to 7) 20 which are clocked on the rising and falling edges of the clock signal (that is at a double data rate). The transmitter block also provides a valid signal 22, a first clock signal CK 24 and a second clock signal CKN 26. The first and second clock signal are differential clock signals with the second clock signal shifted by 180° with respect to the clock signal or the inverse of the first clock signal. It may be advantageous for signal integrity to provide a differential clock signal at the interface. In some embodiments, for signal integrity reasons, the first and clock signal edges are transmitted in the middle of the data period to reduce the cross talk from data onto the clock signal. This may in some embodiments reduce clock jitter and other noise effects. The valid signal is clocked at a single data rate.

Likewise, the second physical transmitter block 10 provides data bits 8 to 15, referenced 28, a valid signal 30, a first clock signal CK 32 and a second clock signal CKN 34. These are respective inputs to the second physical receiver block 18. These signals are as described in relation to the first physical transmitter block.

In the 16 bit mode, the valid, first clock and second clock signals 30, 32 and 34 from the second physical transmitter block 10 are not required as these are provided by the outputs of the first physical transmitter block 8. It should be appreciated that for clarity, the signals which are not used in a particular mode are shown in dotted lines in FIGS. 1 and 2. In contrast, as can be seen from FIG. 2 in the dual N bit mode, the valid, first clock and second clock signals from the second physical transmitter 10 are used.

In the first mode, the first physical transmitter block acts as the master block and accordingly provides master control signals, referenced 40 to the second physical transmitter block 10 acting as a slave. In contrast, as shown in FIG. 2, this signal is not required as the first and second physical transmitter blocks 8 and 10 are acting independently.

The first physical transmitter block 8 is configured to receive from the controller the data bits 0-7 to be transmitted, this being referenced 42. At this stage the data is at a single data rate. Two sets of data will be used to generate the corresponding signal transmitted between the dies. A valid signal 44 is also provided from the controller 6 to the first physical transmitter block 8. The first physical transmitter block 8 provides to the controller, a clock signal 46 in order to control the data/valid propagation between the controller and transmitter blocks.

Similarly the controller 6 is able to provide a data signal 50 comprising data bits 8 to 15 and a valid signal 52 to the second physical transmitter block 10. Likewise, the second physical transmitter block 10 is able to provide a clock signal 54 to the controller. It should be appreciated that in the 16 bit mode, the valid signal and clock signal associated with the second physical transmitter block 10 are not used.

Both the first and second physical transmitter blocks 8 and 10 receive a power down pwd signal 48 and 56 respectively in order to independently place each block into a quiescent state.

A control signal 60 is provided to the controller 6 and each of the first and second physical transmitter blocks 8 and 10. This control signal indicates whether the dies operate in a 16 bit or the dual 8 bit mode.

On the second die 4, master control signals 62 are passed from the first physical receiver block 16 to the second physical receiver block 18 when in the 16 bit mode. The first physical receiver block 16 and the second physical receiver block 18 are each configured to provide a respective clock signal 64 and 66 to the second die controller 14 along with a respective valid signal 68 and 70. The first physical receiver block 16 provides the data bits 0 to 7 (referenced 72) to the controller whilst the second physical receiver block 18 provides data bits 8 to 15 (referenced 74) to the controller.

It should be appreciated that in the 16 bit mode shown in FIG. 1, the valid and clock signal outputs of the second physical receiver block 18 are not required. In contrast, these outputs are, as shown, used in the dual 8 bit mode shown in FIG. 2.

As with the arrangement on the first die, a control signal 80 is provided to each of the first and second physical receiver blocks 16 and 18 as well as the controller 14. This control signal will indicate if the die is operating in the 16 bit mode or the dual 8 bit mode. It should be appreciated that in some embodiments that this same control signal may not be provided to the controller. A different mechanism may be used to ensure that the controller is aware of the mode of operation.

Thus, FIGS. 1 and 2 show the two modes of operation. FIG. 1 shows the 16 bit mode with the unused signals shown in dotted lines, that is the valid signals received and output by each of the second physical transmitter block and second physical receiver block, the clock sent from the second physical transmitter block 10 to the controller, the clock sent from the second physical receiver block 18 to the controller 14 and the first and second clock signals 32 and 34 passing from the second physical transmitter block 10 to the second physical receiver block 18.

In the second mode of operation shown in FIG. 2, the signals which are not used are the master control signals 40 and 62 passing from the first physical transmitter block or first physical receiver block to the respective second physical transmitter block 10 or the second physical receiver block 18.

The controller on the first die 6 and the controller on the second die 14 are configured using the control signal 60 and 80 respectively to operate in either the 16 bit mode of FIG. 1 or the dual 8 bit mode shown in FIG. 2. The master control signals 40 and 62 which pass from the first physical transmitter or receiver block to the respective second physical transmitter or receiver block are used to control the timing and functionality of the second physical block, in the first mode of operation.

Figure 3:
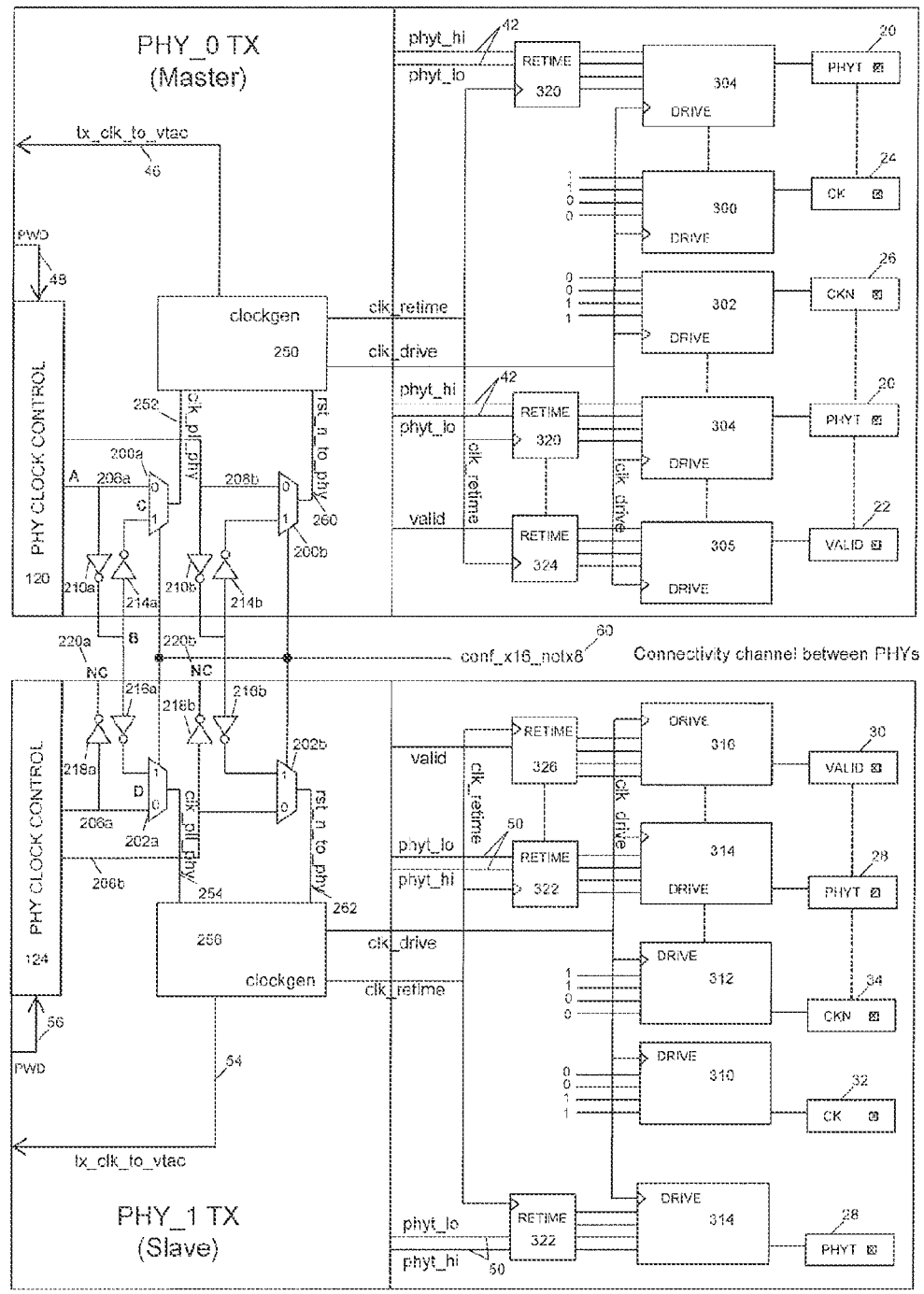
FIG. 3 shows the structure of the transmitter blocks of FIGS. 1 and 2 in more detail.

Reference is now made to FIG. 3 which shows the first signal transmitter block 8 and the second physical transmitter block 10 in more detail. Each of the physical transmitter blocks 8 and 10 has a physical clock controller 120 and 124. The physical clock controllers 120 and 124 are configured to receive the respective pwd signal 48 and 56. It should be appreciated that when this signal is in a first state, the physical transmitter block is operational and when this signal is in a second state, the physical transmitter block is switched off. It should be appreciated that in some embodiments, it may be advantageous in the second mode of operation to switch off either of the physical transmitter blocks. This can be achieved by applying the appropriate state of the pwd signals. By doing this the corresponding physical receiver block is also powered off since the respective first and second clock signals will be stopped.

In the arrangement shown in FIG. 3, the two physical transmitter blocks are placed in a mirrored arrangement with the same layouts. The control circuits may be located close to the abutting edges of the physical transmitter blocks in order to minimize the routing of the master control signals. This may facilitate the balancing of the master control signals. The mirroring of the two transmitter blocks with the same layout means that the control signal length is reduced and of the same length. This facilitates balancing.

Figure 5:
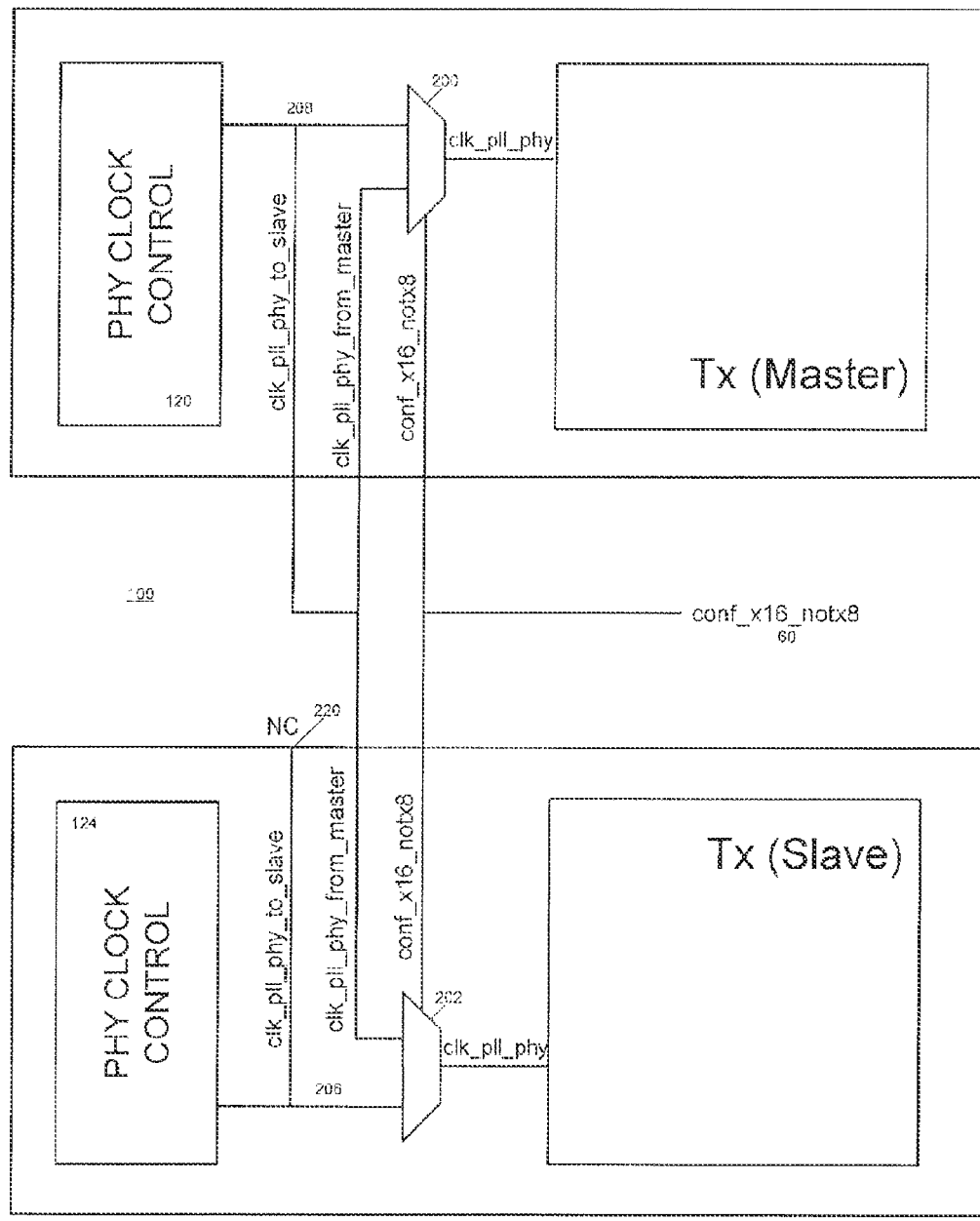
FIG. 5 shows a circuit block used in the arrangements of FIGS. 1 and 2.

To simplify the explanation of the arrangement, reference is now made to FIG. 5 which shows an arrangement which is used several times in the arrangement of FIG. 3. The arrangement shown in FIG. 5 can be used in both the physical transmitter blocks and the physical receiver blocks.

The arrangement has a first multiplexer 200 in the first transmitter block and its mirrored counterpart, second multiplexer 202 in the second transmitter block. The first multiplexer 200 has a first input 208 to the "0" input and to the "1" input. This first input 208 is also provided to the "1" input of the second multiplexer 202. The input 208 is provided by the clock controller 120 for the first transmitter block 8. The second multiplexer has the "0" input provided by the output 206 of the clock controller 124 associated with the second transmitter 10. The output of the clock controller 124 associated with the second transmitter block is also tied to a not connected NC node 220.

The mode signal 60, which controls the mode of operation of the arrangement is provided as a control input to each of the first and second multiplexers 200 and 202. The output of the first multiplexer 200 provides a clock signal for the first transmitter block 8 and the output of the second multiplexer 202 provides a clock signal for the second transmitter block 10. The connections between the two multiplexers 200 and 202 are provided via the connectivity channel 100.

In the 16 bit mode, the master physical block will control the slave physical block. The mode control signal 60 will select the "1" inputs from both the multiplexers as the respective output. Accordingly, the signal from the first physical clock controller is provided by both the first and second multiplexers 200 and 202 as the output.

In the dual 8-bit mode operation, the mode signal 60 will select the dual mode and accordingly will select the "0" outputs of each of the multiplexers 200 and 202 as the output. Thus the first multiplexer 200 will output the clock signal provided by the first physical clock controller 120 and the second multiplexer will output the clock signal provided by the second physical clock controller 124.

As can be seen, the arrangement of the multiplexers and the buffers is mirrored about the connectivity path between the blocks. The paths are constructed such that in the 16 bit mode, the clock signal from the first physical clock controller reaches the inputs of the respective first and second multiplexers at the same time. The delay of the two paths is thus the same.

It should be appreciated that in some embodiments, the "1" input of the multiplexer may be used for the dual 8 bit mode and the "0" input for the 16 bit mode or vice versa, for example with an inversion of the control signal.

In some embodiments one or more delay elements may be provided in the paths. These may be buffering elements such as inverters or any other suitable buffering elements. In embodiments, the buffering arrangements of the two physical blocks are balanced. In other words, the same number of buffering elements is used in the two physical blocks, particularly in those embodiments where the layout is identical.

In this regard, reference is made to FIG. 3 which shows first and second inverters 210 and 214 in the path to the "1" input of the first multiplexer 200 and first and third inverters 210 and 216 in the path to the "1" input of the second multiplexer 202. A fourth inverter 218 is the mirror of the first inverter 210. The output of the fourth inverter is coupled to the not connected node 220. The arrangements on the two dies are thus balanced automatically as a result of the mirroring of the structure.

The circuitry shown in FIG. 5 is used twice in the arrangement of FIG. 3. This circuitry also includes the invertors discussed above. The first such arrangement has the same reference numerals as shown in FIG. 5 but with the suffix "a". The output of the first multiplexer 200a provides a derivative of the phase lock loop clock 252 which is provided to a clock generator 250 on the first physical transmitter 8. The output of the second multiplexer 202a provides a derivative of the phase lock loop clock 254 to the clock generator 256 of the second physical transmitter 10.

The second circuit is referenced with the suffix "b". The output of the first multiplexer 200b provides the reset signal signal rst_n_to_phy 260. This signal is provided to the clock generator 250. Similarly, the second multiplexer 202b provides the reset signal rst_n_to_phy 262 to the clock generator 256. These are reset signals.

It should be appreciated that in alternative embodiments, there may be fewer or more than the two circuits provided. This arrangement may be used where the signal in question is independent of the corresponding signal in the second mode of operation.

Alternatively or additionally the circuitry may be used to provide a pwd_xtac signal. This signal is provided to the clock generator 250 to switch off the clock which controls the transmitter block. Likewise, the output of the second multiplexer 202 provides the pwd_xtac signal to the clock generator 256.

Alternatively or additionally the circuitry may be used to provide a pwd_phy signal. This signal is provided to the clock generator 250 to switch off internal clocks of the of the transmitter block. Likewise, the output of the second multiplexer 202 provides the pwd_phy signal to the clock generator 256.

As shown in FIG. 3, the first physical transmitter has a first drive circuit 300 for the first clock 24, a second drive circuit 302 for the second clock 26, third to eleventh drive circuits 304 for each of the 0 to 7 PHYT or data bits 20 and a twelfth drive circuit 305 for the valid signal 22. Associated with each of the third to twelfth drive circuits is a respective retime circuit 320, 324. It should be appreciated that each of the drive circuits has the same or similar construction. The retime and drive circuits may be used to derive correct timing relationships between the clock signals and the valid/data signals.

The second physical transmitter block 10 is the same as the first physical transmitter block 8 and has a first drive circuit 310 for the first clock signal 32, a second drive circuit 312 for the second clock signal 34, a third to eleventh drive circuit 314, one for each of the respective bits 8 to 15, and a twelfth drive circuit 316 for the valid signal 30. Associated with each of the third to twelfth drive circuits is a respective retime circuit 322, 326.

The drive circuits 300, 302, 304 to 305 of the first physical transmitter receive a clock drive signal output from the clock generator 250. Likewise, each of the drive circuits 310, 312, 314 to 316 of the second physical transmitter receive a clock drive signal output from the clock generator 256. The drive and retiming circuits are arranged in mirrored fashion in each of the transmitter blocks about the connectivity channel 100 by construction. The arrangement of the drive and retiming circuits in each block may such to provide an optimized performance.

The controller 6 provides to the first physical transmitter block data in two streams phyt_hi(0:7) and phy_lo(7:0) over eight parallel links. This data is shown as being input to the retime circuit 320 along with a clock signal from the clock generator 250. The respective retime circuits 320 in combination with the respective drive circuits 304 will combine the two streams and will transmit the data in a single stream, 8 bits wide using both the rising clock edge and the falling clock edge. The second physical transmitter has similar retime circuits 322 arranged to receive the phyt_lo and phyt_hi data streams for bits 8 to 15. Again, the respective retime circuit 322 also receives an output from the clock generator 256.

The valid signal from the controller 6 is input to a respective retime circuit 324 in the case of the first physical transmitter and a retime circuit 326 in the case of the second physical transmitter. The respective retime circuits 324 and 326 for the valid signals each receive a respective control signal from the clock generator 250 or 256 as the case may be. In the example shown in FIG. 3, the two retime circuits on each physical transmitter receive the same clock output from the respective clock generating circuit. It should be appreciated that the retime circuits are arranged symmetrically about the connectivity channel.

The first and second drive circuits 300, 302, 310 and 312 each receive a respective four wired signal which are used to sequence the respective first or second clock signal.

Thus, in the arrangement shown, the connection between the two transmitters is achieved at a higher level of hierarchy in the channel between the physical transmitters. Minimizing the connection routes in this channel assists in good balancing, in some embodiments.

If timing closure of each physical transmitter block is made for the dual mode of operation, then timing closure for the 16 bit mode of operation may be achieved by making the buffer paths of all master control signals identical. This is because the same delay on the clock path of the cll_pll_phy 252, 254 and other signals such as pwd_xtac, rst_n_to_phy and pwd_phy, where used will ensure practically the same set-up and hold timings in both modes of operation. This may be facilitated by one or more of the use of identical and mirrored blocks, by minimizing the delay of buffer paths in each block, by the placement of source and destination circuitry close to the connectivity channel and by minimizing the loading caused by the inter block routing in the connectivity channels. It should be appreciated that this may be the case additionally or alternatively for the receiver blocks.

The clock generator blocks 250 and 256 respectively provide the clock signal tx_clk_to_vtac which are provided to the controller 6.

Figure 4:
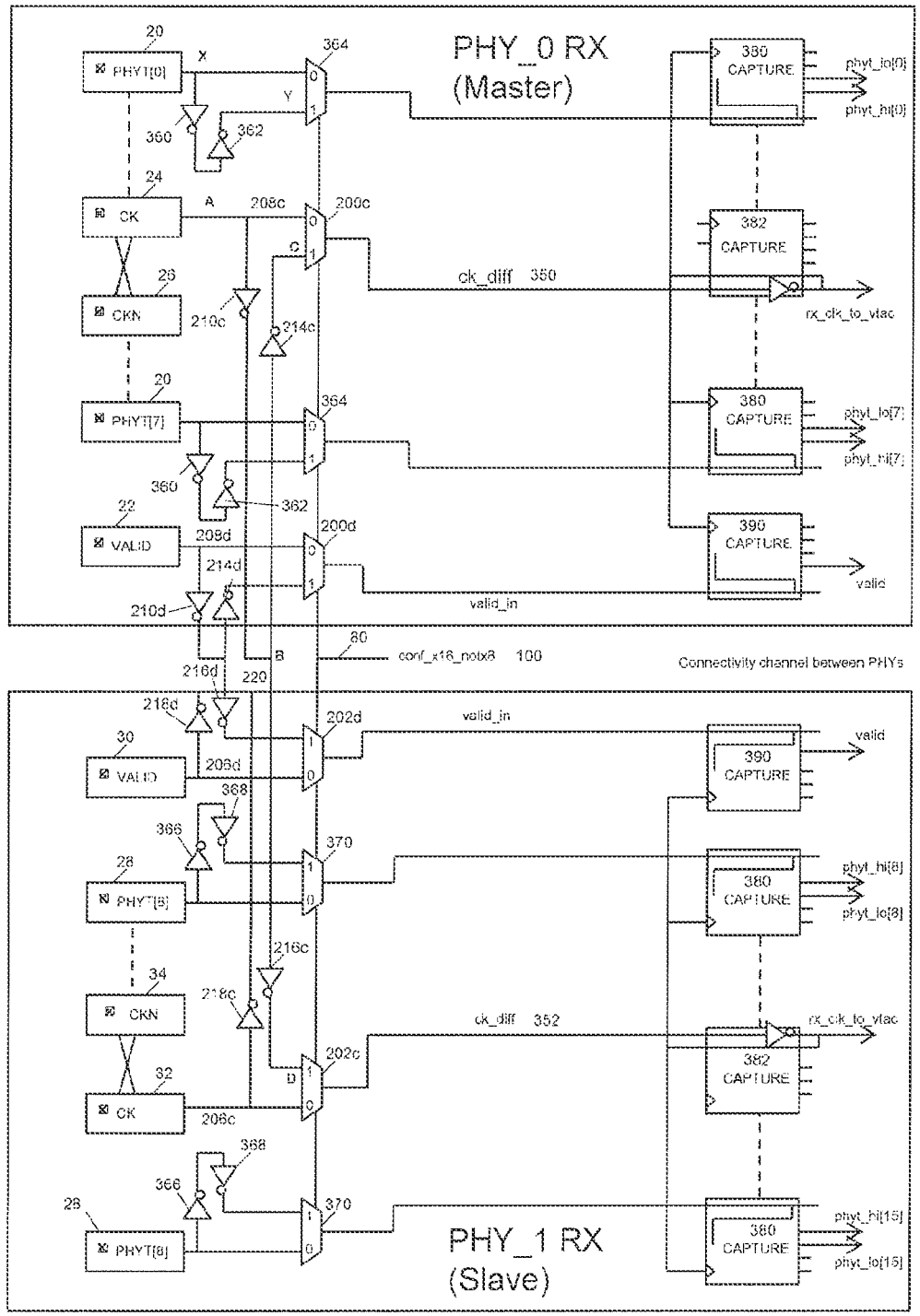
FIG. 4 shows the receiver blocks of the arrangement of FIGS. 1 and 2 in more detail.

The receiver blocks similarly use a mirrored layout. Reference is now made to FIG. 4 which shows the first and second physical receiver blocks 16 and 18 of FIGS. 1 and 2 in more detail. The routing and buffering method of the signals is similar to the transmission case The first and second physical receivers have a first circuit, as illustrated in FIG. 5. This circuit is referenced with the suffix "c" with the invertors of FIG. 3. The input is provided by the respective clock signals. Thus, a clock differential signal comprises input 208c to the first multiplexer 200c and a clock differential clock signal comprises the input 206c to the second multiplexer 202c. The output of the first multiplexer 200c provides a clock differential signal 350. Likewise, the output of the second multiplexer 202c provides a clock differential signal 352.

A second circuit of the type shown in FIG. 5 is also provided. This second circuit is referenced with the suffix "d" again with the invertors of FIG. 3. The input 208d to the multiplexer 200d is provided by the valid signal 22 whilst the input 206d to the second multiplexer 202d is provided by the valid signal 30. The output of the first multiplexer 200d provides a valid signal to a valid capture circuit 390 in the first receiver block. Likewise, the output of the second multiplexer 202d provides a valid output to a valid capture circuit 390 in the second physical receiver.

Each of the bits of the received data 0 to 7 on the die is output to a respective first inverter 360, the output of which is coupled to a second inverter 362, the output of which is coupled to a multiplexer 364. The respective bit is also directly coupled to the other input of the multiplexer 364.

Similar inverters 366 and 368 coupled to a multiplexer 370 arranged in a similar way are also provided for each of the bits of the data input to the second physical receiver. It should be appreciated that the inverter route is used for the bits when the 16 bit mode is selected. The mode signal 80 is used by the multiplexers 364 and 370. The inverters provide a delay which matches the delay which is experienced by the differential clock signal. The output of the respective multiplexers 364 and 370 are each input to a respective capture circuit 380.

The respective capture circuitry 380 take the received data and reassembles it back into the high and low data which is sent to the respective controller.

The clock differential signal 350, 352 is provided to respective capture circuits 382 in the respective first and second physical receiver blocks. The output of the capture circuitry 382 provides the receiver clock which is sent to the respective receiver controller. These respective capture circuits do not provide a capture function as such but are used to balance equivalent delays in the delay/valid capture paths.

The outputs of multiplexers 200d and 202d are also provided to respective capture circuitry 390 in the first and second physical receivers for capture of the valid signal. The output of the respective capture circuitry 390 provides the valid signal which is output to the respective receiver controller.

All the capture circuits are configured to receive the same clock signal. In general, the capture circuitries will have a same or similar structure in order to achieve desired timing.

In the physical receiver, a capture timing of the data signals is achieved using the CK/CKN differential signal as a source clock. Since in the 16 bit mode, the delay for signal 208c to the first and second multiplexers 200c and 202c delays the differential clock, and the same delay is provided in the path for the data bits. This delay is provided by the inverters 360 and 362 in the case of the first physical receiver and by inverters 366 and 368 in the case of the second physical receiver. This may be used in some embodiments to maintain optimal margins in the delay stage. It should be appreciated that this requirement may be a feature of some applications and may not be required in alternative embodiments.

The clock CK/CKN pads may be arranged in the middle of the data/valid pad in order to reduce the clock tree insertion on the capture clock on the receive die. The pads on the transmit die may be arranged similarly to give simpler interdie routing.

In some embodiments, it may be only required to use one of either 8 bit interfaces. The other 8 bit interface can be switched off via, for example the PWD signals. This switching off of one or other or both of the interfaces may be at certain time periods in order for example to save power or in response to the occurrence of a condition. In some embodiments, it may not be necessary to explicitly power down the physical receivers since the CK/CKN clocks may be stopped from the physical transmitters.

In some embodiments, in the dual mode interface there may be circuitry in the slave block that becomes redundant in the 16 bit mode since all the control is provided from the master receiver or transmitter. For example, although not shown, some blocks may have a DLL (not shown) which may provide accurate adjustable timing. Accordingly, in some embodiments, the slave DLL may be switched off to save power in the 16 bit mode. It should be appreciated that alternative or additional specific circuits in the slave receiver and/or transmitter may be switched off in the 16 bit mode.

There may be advantages in using the circuitry such as shown in FIG. 5 in both the receiver and the transmitter. This may improve the timing in some embodiments.

Embodiments may be used in any suitable arrangement. For example, some embodiments may be used in DDR system.

It should be appreciated that the data rates used in the above embodiments are by way of example only and different data rates may be used in alternative embodiments.

Embodiments may be used with two or more dies as described. The dies may be in the same package or may be in different packages in some embodiments.

It should be emphasized that other embodiments may be used in a different situation to the two or more die embodiments described above. By way of example, the different blocks may be provided on an integrated circuit or be provided by two or more integrated circuits or even by discrete circuitry arrangements. Embodiments are not limited to application to a dies in a system-in-package.

Embodiments may be used with video devices. By way of example only, such devices may include televisions, set top boxes, computers, mobile phones, smart phones, DVD players, media players, hard disk players or the like.

The foregoing description has provided by way of exemplary and non-limiting examples a full and informative description of the some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope of this invention as defined in the appended claims.

What is claimed is:
1. A circuit, comprising:
a first n-bit communications block;
a second m-bit communications block; and
a controller configured to control said first and second communications blocks in at least two modes including:
a first mode wherein said first and second communications blocks function as a single communications block for n+m bit communications, wherein said first communications block is configured to provide at least one control signal to said second communica- tions block in said first mode, said at least one control signal comprising at least one of a clock signal and a valid signal; and a second mode wherein said first and second communications blocks operate as substantially independent communications block for n bit communications and m bit communications.

2. The circuit as claimed in claim 1, wherein n equals m.

3. The circuit as claimed in claim 2, wherein said first and second communications blocks have a same circuitry.

4. The circuit as claimed in claim 2, wherein said first and second communications blocks have a same layout and are arranged in a mirrored configuration.

5. The circuit as claimed in claim 1, comprising a connectivity channel between said first and second blocks which is configured to carry said at least one control signal.

6. The circuit as claimed in claim 5, wherein said first and second communications blocks have a same layout and are arranged in a mirrored configuration and wherein said first and second blocks are arranged in said mirrored configuration about said connectivity channel.

7. The circuit as claimed in claim 1, wherein when in said first mode, said first communications block comprises a master communications block and said second block comprises a slave communications block of said single communications block, and wherein said at least one control signal comprises a control signal configured for said master communications block to control the operation of said slave communications block.

8. The circuit as claimed in claim 1, wherein in said first mode, said controller is configured to provide data and at least one other signal to said first communications block and to provide data to said second communications block, said controller being configured to provide no corresponding other signal to said second communications block with said second communications block controlled for operation in response to said at least one control signal provided by the first communications block and derived from the at least one other signal.

9. The circuit as claimed in claim 1, wherein in said first mode, said controller is configured to receive data and at least one other signal from said first communications block and to receive data from said second communications block, said controller being configured to receive no corresponding other signal from said second communications block.

10. The circuit as claimed in claim 9, wherein said controller is configured to receive a clock signal from said first communications block in the first mode and to receive separate clock signals from said first and second communications blocks in said second mode.

11. The circuit as claimed in claim 1, wherein the first and second communications blocks are configured such that that a timing of a path followed by said at least one control signal in said first communications block is substantially the same as a timing of a path followed by said at least one signal in said second communications block.

12. The circuit as claimed in claim 1, wherein said controller is configured to control said first and second communications blocks additionally in a third mode wherein one of said first and second communications blocks is powered down.

13. The circuit as claimed in claim 1, wherein said first mode is used for communicating one 3D video image data stream.

14. The circuit as claimed in claim 1, wherein said second mode is used for communicating two 2D video image data streams.

15. The circuit as claimed in claim 1, wherein said first and second communications blocks are one of transmitter blocks and receiver blocks.

16. The circuit as claimed in claim 1, wherein the circuit comprises an integrated circuit or die.

17. The circuit as claimed in claim 1, wherein the circuit is a component of a video device.

18. A circuit, comprising:
a first transceiver having an n-bit communications port configured to communicate n-bit communications data and a first clock port configured to communicate a first clock signal;
a second transceiver having an m-bit communications port configured to communicate m-bit communications data and a second clock port configured to communicate a second clock signal;
a controller configured to control said first and second transceivers in a first mode wherein said n-bit communications data and said m-bit communications data are clocked by the first clock signal at said first clock port and in a second mode wherein said n-bit communications data is clocked by the first clock signal at said first clock port and said m-bit communications data is clocked by the second clock signal at said second clock port; and
wherein said first transceiver in the first mode is configured to provide a clock control signal to said second transceiver, said second transceiver operating in said first mode to communicate m-bit communications data in response to receipt of said control clock signal from said first transceiver.

19. The circuit of claim 18, wherein said first transceiver further has a first control port configured to communicate first control data; wherein said second transceiver further has a second control port configured to communicate second control data; and wherein said n-bit communications data and said m-bit communications data in said first mode are controlled by the first control signal, said n-bit communications data in said second mode is controlled by the first control signal and said m-bit communications data in said second mode is controlled by the second control signal.

20. The circuit of claim 18, wherein n equals m.

21. The circuit of claim 18, further comprising a mode control channel connected between said first and second transceivers.

22. The circuit of claim 18, wherein said n-bit communications data and said m-bit communications data together in said first mode communicate one 3D video image data stream.

23. The circuit of claim 18, wherein said n-bit communications data and said m-bit communications data separately in said second mode communicating two 2D video image data streams.

24. A circuit, comprising:
a first n-bit transceiver;
a second m-bit transceiver; and
a controller configured to control operation of said first and second transceivers in an operating mode selected from a plurality of supported operating modes including:
a first mode wherein said first and second transceivers are configured to support n+m bit communications in response to a single clock signal, said first transceiver generating a first clock signal from which the n bit portion of the n+m bit communications generated and further configured to pass a clock control signal to said second transceiver, with the second transceiver configured to generate a second clock in response to said clock control signal from which the m bit portion of the n+m bit communications is generated; and a second mode wherein said first and second transceivers are configured to support separate n-bit and m-bit communications in response separate clock signals.

25. The circuit of claim 24, wherein the single clock signal is associated with the first n-bit transceiver and wherein the first and second transceivers include circuitry configured to generate the first and second clocks, respectively, with same timing.

* * * * *